April 18, 1933.  H. W. TOBEY ET AL  1,904,104
WELDING TORCH
Filed Sept. 24, 1931

Inventors:
Harry W. Tobey,
Harold V. May,
by Charles E. Mullan
Their Attorney.

Patented Apr. 18, 1933

1,904,104

UNITED STATES PATENT OFFICE

HARRY W. TOBEY AND HAROLD V. MAY, OF PITTSFIELD, MASSACHUSETTS, ASSIGNORS TO GENERAL ELECTRIC COMPANY, A CORPORATION OF NEW YORK

WELDING TORCH

Application filed September 24, 1931. Serial No. 564,882.

Our invention relates to welding, and more particularly to an improved welding torch for gas-arc welding. In gas-arc welding the welding operation is performed through the agency of an electric arc and a gaseous medium supplied to and about the arc.

Our invention is particularly applicable to the utilization of the heating effects of flames of atomic hydrogen. An atomic hydrogen flame may be produced by dissociating hydrogen through the agency of an electric arc and then allowing the dissociated hydrogen to recombine or "burn." Upon recombination the atomic hydrogen liberates an enormous amount of heat which may be used for welding or like operations. The utilization of such atomic hydrogen flames is disclosed and claimed broadly in the co-pending application of Irving Langmuir, Serial No. 729,185, filed July 30, 1924, for Heating process and apparatus, which application is assigned to the same assignee as the present application.

While our invention is well suited for atomic hydrogen flame welding, many of the features of construction thereof are of general application to the type of welding apparatus wherein an arc is maintained between a plurality of electrodes supported adjacent the work, and a welding medium of any suitable character is supplied to and about the arc and the work being welded.

It is an object of our invention to provide a gas-arc torch of improved construction particularly suited for use in automatic machines.

Another object of our invention is to provide a gas-arc welding torch in which the welding medium is supplied to and about the arc in a manner to stabilize its operation and produce along the line of welding a uniform heat zone.

A further object of our invention is to provide means for establishing a stable arc fan which will give deep penetration with reduced values of current and heat.

Figure 1:
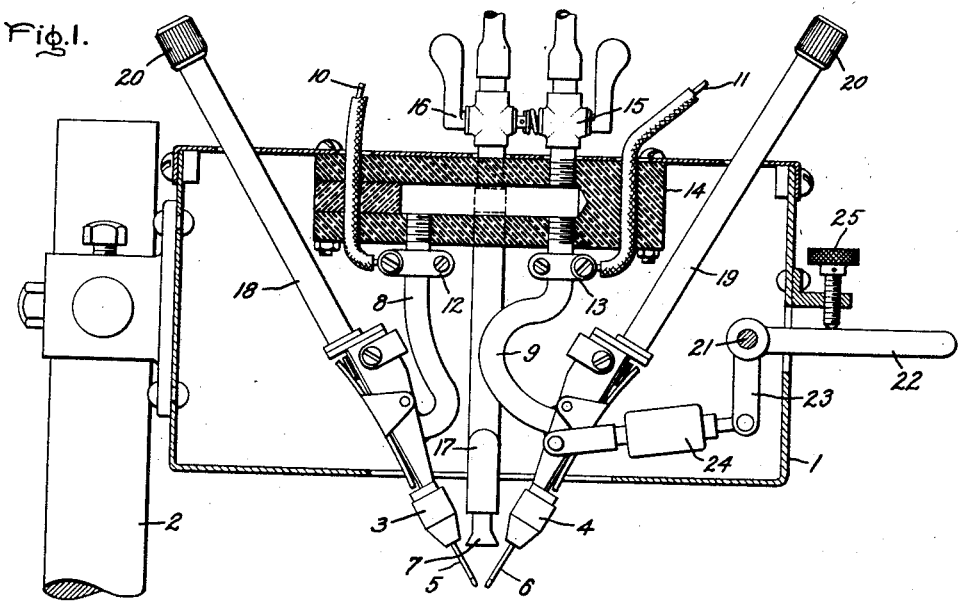
Figure 2:
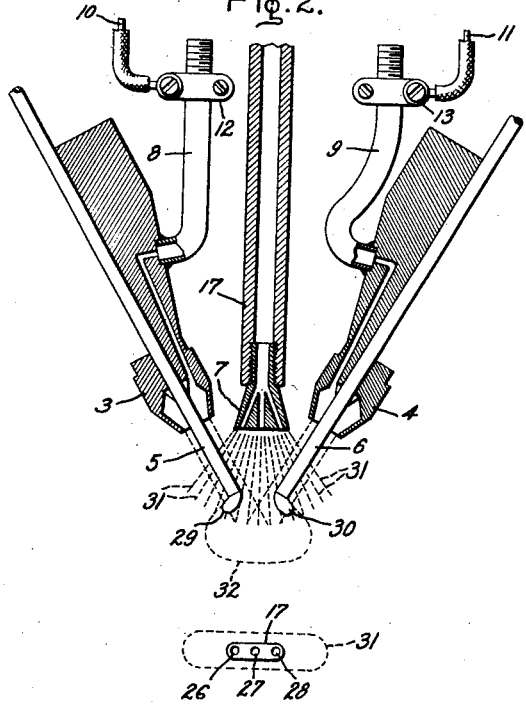
Figure 3:
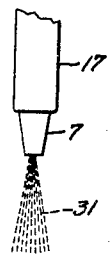

Our invention will be better understood from the following description taken in connection with the accompanying drawing in which Fig. 1 is a side view, partly in section, of a welding head containing a torch constructed in accordance with our invention; Fig. 2 is a digrammatic sectional view of the nozzle members of the welding torch of Fig. 1, and Fig. 3 is a side view of the central nozzle member of Fig. 2.

In Fig. 1 the welding torch is enclosed within a box-like container 1 which is supported on a vertical member 2 forming part of an automatic arc welding machine. The construction of the machine itself has not been illustrated in the drawing since any machine by means of which the work and the welding torch are traversed relatively to one another along the seam to be welded will prove satisfactory. The welding torch comprises a plurality of electrode holders 3 and 4 for holding electrodes 5 and 6 in converging positions relatively to one another and a nozzle member 7 for directing a fan-shaped stream of gas across and about the arcing terminals of the electrodes 5 and 6. The electric holders also constitute means for discharging sheaths of gas about the arcing terminal portions of the electrodes supported therein. The construction of the electrode holders is fully described and claimed in Patent No. 1,808,541, R. T. Gillette and E. S. Webster, granted June 2, 1931, and assigned to the same assignee as the present application.

Gas is supplied to these electrode holders through tubes 8 and 9. These tubes also serve as conductors for supplying welding current to the electrodes 5 and 6. Current is supplied to these tubes by means of conductors 10 and 11, which are attached thereto by clamps 12 and 13. Tubes 8 and 9 terminate in a header 14 of insulating material to which gas is supplied through a valve 15. Gas is also supplied to the nozzle 7 through a valve 16 and tube 17. By reason of the connection above described the supply of gas through electrode holders 3 and 4 is controlled by valve 15, and the supply of gas through nozzle 7 is controlled by valve 16 thereby permitting an independent adjustment of these two supplies.

The electrodes 5 and 6 are preferably formed of some refractory metal such as tungsten and are fed through the electrode holders 3 and 4 by feeding mechanisms 18 and 19 having the construction illustrated and described in the application of Harold V. May, Serial No. 540,393, filed May 27, 1931, for a Welding torch, which application is assigned to the same assignee as the present application. This construction comprises a screw feeding mechanism by means of which the electrodes are fed through their holders when knobs 20 of the feeding mechanism are rotated. The electrode holders are supported in the relative positions illustrated through the agency of the tubes 8 and 9. One of these tubes 9, is provided with a goose neck by means of which sufficient resiliency is imparted thereto so that electrode holder 4 may be moved toward electrode holder 3 in order to bring the electrodes into engagement for striking the arc. This operation is accomplished through an arc striking mechanism comprising a bell-crank lever pivoted in the torch supporting box 1 by means of a pin 21. One end of the lever, 22, extends out of the box through an opening therein, and the other end of the lever, 23, is connected through an insulating member 24 to the electrode holder 4. An adjustable stop 25 is provided for limiting the separation of the electrodes to the desired amount. This stop constitutes a screw member, the end of which engages the end 22 of the bell crank lever above referred to.

The construction of the nozzle members of the above-described torch is illustrated in Fig. 2. The electrode holders 3 and 4 constitute nozzle members by means of which sheaths of gas are directed longitudinally of the arcing terminal portions of the electrodes extending therethrough and nozzle 7 constitutes means for directing in the plane of the electrodes and across their arcing terminals a wedge-shaped stream of gas which diverges from a point between these electrodes. The particular embodiment illustrated comprises a plurality of jets 26, 27 and 28, by means of which a fan-shaped stream of gas is discharged about the arcing terminals of the electrodes. The shapes of the jets of gas discharged through the electrode holders 3 and 4 and the nozzle 7 have been indicated in Figs. 2 and 3 by dotted lines 31. The shape of the resulting arc flame has also been shown in dotted lines 32 in Fig. 2. In the particular construction illustrated, jets 26, 27 and 28 are $\frac{1}{16}$ of an inch in diameter, and produce a flow of gas which blows the molten arcing terminals 29 and 30 of the electrodes 5 and 6 in divergent directions as illustrated in Fig. 2. Sufficient gas is supplied through the electrode holders 3 and 4 to produce a soft flow of gas which envelops the arcing terminal portions of the electrode holders and protects them from the surrounding atmosphere. Gas at a much higher pressure is supplied through the nozzle 7. For a nozzle of the dimensions above given, pressures of about 5 pounds have been used. This gives a jet of considerable force. In order to prevent the driving force of this jet from blowing out the arc, it is necessary to use voltages of from 550 to 650 volts. With 650 volts and only 45 amperes we are able to obtain with a torch of the construction illustrated complete penetration of $\frac{1}{4}$ inch metal with filler strip at a speed of 4 inches per minute.

The jet blowing against the electrodes has a direct effect on the position of the arc fan. The electrodes act as baffles upon which the jet impinges, and the continual change in shape of the electrode ends causes the direction of the arc fan also to change. By supplying a fan-shaped jet of gas in accordance with our present invention the inside surfaces of the electrodes are kept clean and the balls of molten material formed on the ends of the electrodes are blown in the definite desired position illustrated in the drawing. The particular shape of the jet also acts to stretch the arc established between the electrodes by exerting thereon a mechanical pressure which forces the arc fan outwardly and laterally from the arcing terminals of the electrodes, thereby producing an arc of the shape illustrated by dotted lines 32 in Fig. 2 of the drawing. The welding operation is performed with the arc fan parallel to the direction of travel. In the machine of Fig. 1 this will be from right to left, or left to right.

Although we prefer to employ the particular construction illustrated and described, other constructions may be employed by means of which a fan-shaped or wedge-shaped stream of gas is directed across and about the arcing terminals of the electrodes.

The use of the torch is not necessarily restricted to automatic arc welding machines. It is also suitable for hand welding operations in which case the torch illustrated in the drawing will be provided with a suitable handle by means of which the operator may readily manipulate the torch when performing a welding operation.

Other modifications of our invention will occur to those skilled in the art, in view of the particular arrangement above described, and we therefore aim in the appended claims to cover all such modifications as fall within the true spirit and scope of our invention as set forth in the appended claims.

What we claim as new and desire to secure by Letters Patent of the United States is:

1. Welding apparatus comprising means for holding a plurality of electrodes in converging positions relatively to one another, and means for directing a fan-shaped stream of gas across and about the arcing terminals of said electrodes.

2. Welding apparatus comprising means for holding a plurality of electrodes in converging positions relatively to one another, and means for directing in the plane of the electrodes and across their arcing terminals a wedge-shaped stream of gas which diverges from a point between said electrodes.

3. Welding apparatus comprising means for holding a plurality of electrodes in converging positions relatively to one another, means for directing sheaths of gas along the arcing terminal portions of said electrodes, and means for directing in the plane of the electrodes and across their arcing terminals a wedge-shaped stream of gas which diverges from a point between said electrodes.

4. Welding apparatus comprising means for holding a plurality of electrodes in converging positions relatively to one another, and means for directing in the plane of the electrodes and across their arcing terminals a plurality of jets of gas which diverge from a point between said electrodes.

5. Welding apparatus comprising means for holding a plurality of electrodes in converging positions relatively to one another, means for producing a sheath of gas about the arcing terminal portions of said electrodes, and means for directing in the plane of the electrodes and across their arcing terminals a plurality of jets of gas which diverge from a point between said electrodes.

6. Welding apparatus comprising means for holding a plurality of electrodes in converging positions relatively to one another, and means for blowing the molten arcing terminals of said electrodes in divergent directions.

7. Welding apparatus comprising means for holding a plurality of electrodes in converging positions relatively to one another, and means for stretching a welding arc established between said electrodes by exerting thereon in the plane of the electrodes a mechanical pressure which forces it outwardly and laterally from the arcing terminals of said electrodes.

In witness whereof, we have hereunto set our hands.

HARRY. W. TOBEY.
HAROLD V. MAY.